(12) United States Patent
Romero

(10) Patent No.: US 12,728,788 B2
(45) Date of Patent: Sep. 8, 2026

(54) CARGO SECURING DEVICE

(71) Applicant: Servando Romero, Odessa, TX (US)

(72) Inventor: Servando Romero, Odessa, TX (US)

( * ) Notice: Subject to any disclaimer, the term of this patent is extended or adjusted under 35 U.S.C. 154(b) by 470 days.

(21) Appl. No.: 18/229,877

(22) Filed: Aug. 3, 2023

(65) Prior Publication Data

US 2025/0042325 A1 Feb. 6, 2025

(51) Int. Cl.
*B60P 7/12* (2006.01)
*B60P 7/08* (2006.01)

(52) U.S. Cl.
CPC ............... *B60P 7/12* (2013.01); *B60P 7/0892* (2013.01)

(58) Field of Classification Search
CPC .. B60P 7/0892; B60P 7/12; B60P 7/08; B60P 3/40; B60P 7/17; B60P 3/077; B60P 3/41; B60P 7/15; B61D 45/003; F03D 13/402; B60R 11/00; B60R 2011/0071; B60R 2011/0059; B60R 9/00; B60R 2011/008; B62D 33/0207
USPC ........................................................... 410/49
See application file for complete search history.

(56) References Cited

U.S. PATENT DOCUMENTS

| | | | | |
|---|---|---|---|---|
| 1,411,403 | A * | 4/1922 | Addi | B61D 45/003 105/388 |
| 5,381,939 | A | 1/1995 | Tippets | |
| 5,553,981 | A | 9/1996 | Braden | |
| 5,611,472 | A * | 3/1997 | Miller | B60R 9/00 224/403 |
| 7,281,889 | B2 | 10/2007 | Anderson | |
| 8,322,966 | B2 | 12/2012 | Doskocil | |
| 9,056,577 | B2 | 6/2015 | Corrigan | |

FOREIGN PATENT DOCUMENTS

| | | | | |
|---|---|---|---|---|
| CN | 113459933 | A * | 10/2021 | B60P 3/40 |
| WO | WO2017066316 | | 4/2017 | |

* cited by examiner

*Primary Examiner* — Amy R Weisberg

(57) ABSTRACT

A cargo securing device for securing cylindrical cargo on a cargo trailer includes a rail that has a pair of feet each. The rail can be extended laterally across a cargo trailer having each of the feet engaging a respective attachment brackets on the trailer thereby facilitating cylindrical cargo to be placed upon the rail. A pair of clamps is each of the pair of clamps is slidably integrated into the rail. Each of the pair of clamps is actuatable to travel toward the center of the rail or away from the center of the rail. Additionally, each of the pair of clamps has a slanted gripping element which abuts the cylindrical cargo thereby restraining lateral motion of the cylindrical cargo on the rail.

8 Claims, 6 Drawing Sheets

24
14
58
60
38
26

12
36
10
56
60
14
58
22

5
56
38
38
42
40
42
40
36
36
32
34
5

24
46
14
12
30
26
56
14
22
44

16
20
12
12
18

16
54
14
12
18

CARGO SECURING DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to cargo devices and more particularly pertains to a new cargo device for securing cylindrical cargo to a cargo trailer. The device includes a rail and a pair of feet disposed on opposing ends of the rail thereby facilitating the rail to extend laterally across the cargo trailer having each of the feet engaging respective engaging brackets on the cargo trailer. The device includes a pair of clamps that is each slidably integrated into the rail and each of the pair of clamps has a pair of slanted engaging elements. The cylindrical cargo is positioned on the rail and each of the slanted engaging elements of each of the clamps abuts the cylindrical cargo when the clamps are tightened to inhibit the cylindrical cargo from rolling on the cargo trailer.

(2) Description of Related Art Including Information Disclosed Under 37 CFR 1.97 and 1.98

The prior art relates to cargo devices including a variety of cargo securing devices for securing cargo to a trailer and a trailer device that has a sliding cargo bed. In no instance does the prior art disclose a cargo securing device that includes a rail that is extendable across a cargo trailer and a pair of clamps each slidably integrated into the rail that each has a pair of slanted engaging elements for securing cylindrical cargo to a cargo trailer.

BRIEF SUMMARY OF THE INVENTION

An embodiment of the disclosure meets the needs presented above by generally comprising a rail that has a pair of feet each. The rail can be extended laterally across a cargo trailer having each of the feet engaging a respective attachment brackets on the trailer thereby facilitating cylindrical cargo to be placed upon the rail. A pair of clamps is each of the pair of clamps is slidably integrated into the rail. Each of the pair of clamps is actuatable to travel toward the center of the rail or away from the center of the rail. Additionally, each of the pair of clamps has a slanted gripping element which abuts the cylindrical cargo thereby restraining lateral motion of the cylindrical cargo on the rail.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
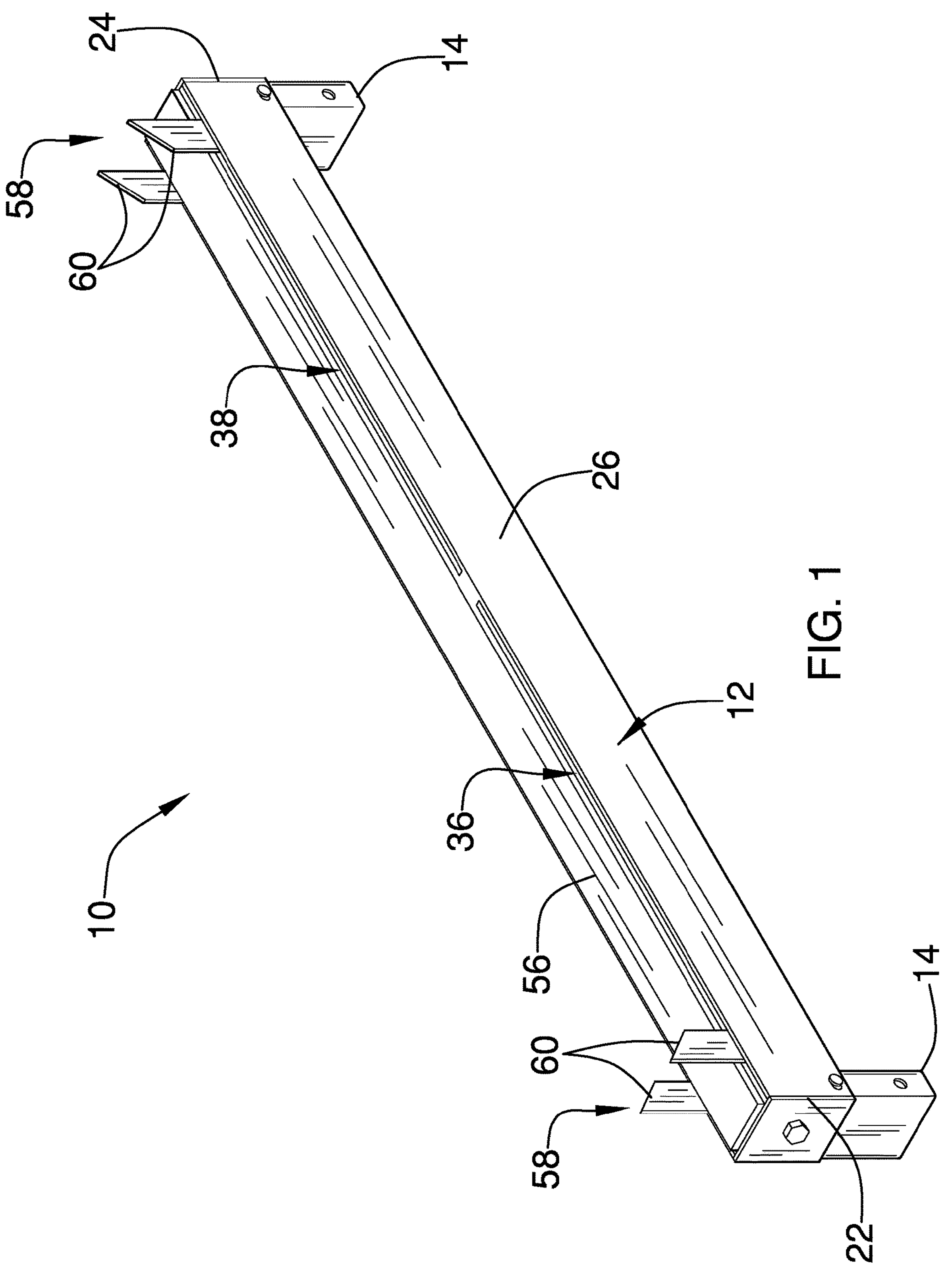
FIG. 1 is a top perspective view of a cargo securing device according to an embodiment of the disclosure.
Figure 2:
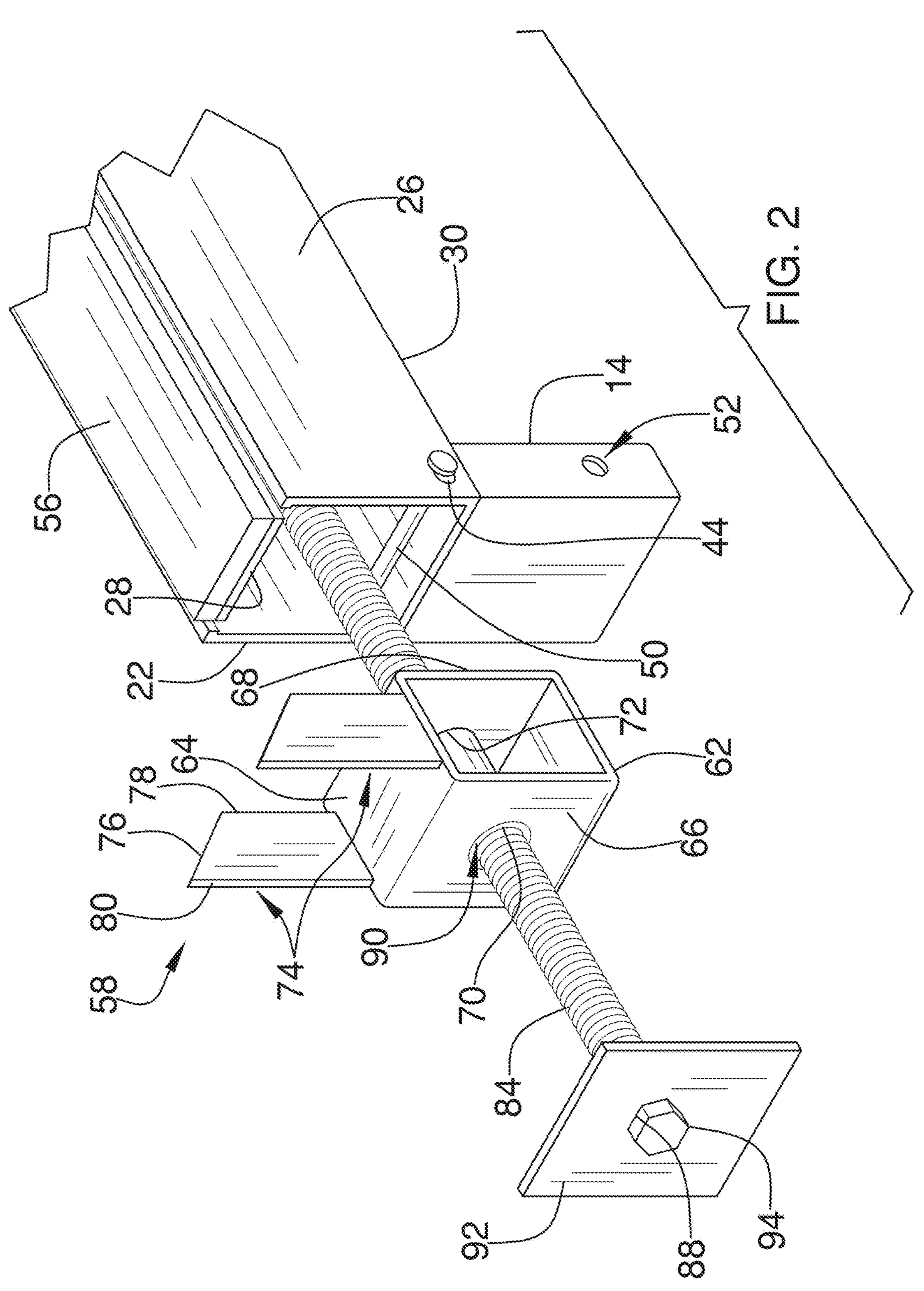
FIG. 2 is an exploded perspective view of an embodiment of the disclosure.
Figure 3:
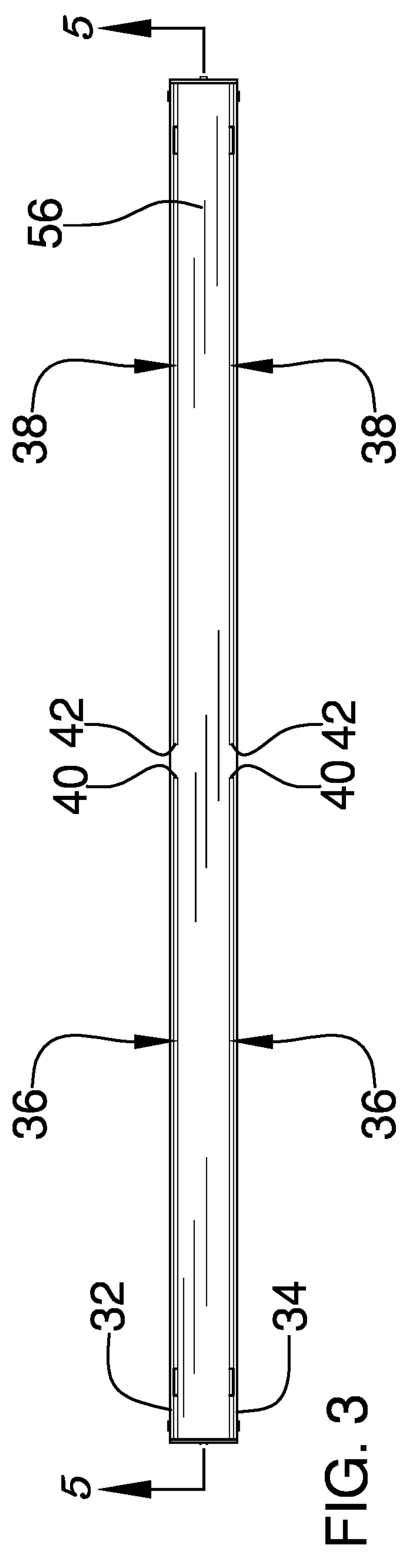
FIG. 3 is a top view of an embodiment of the disclosure.
Figure 4:
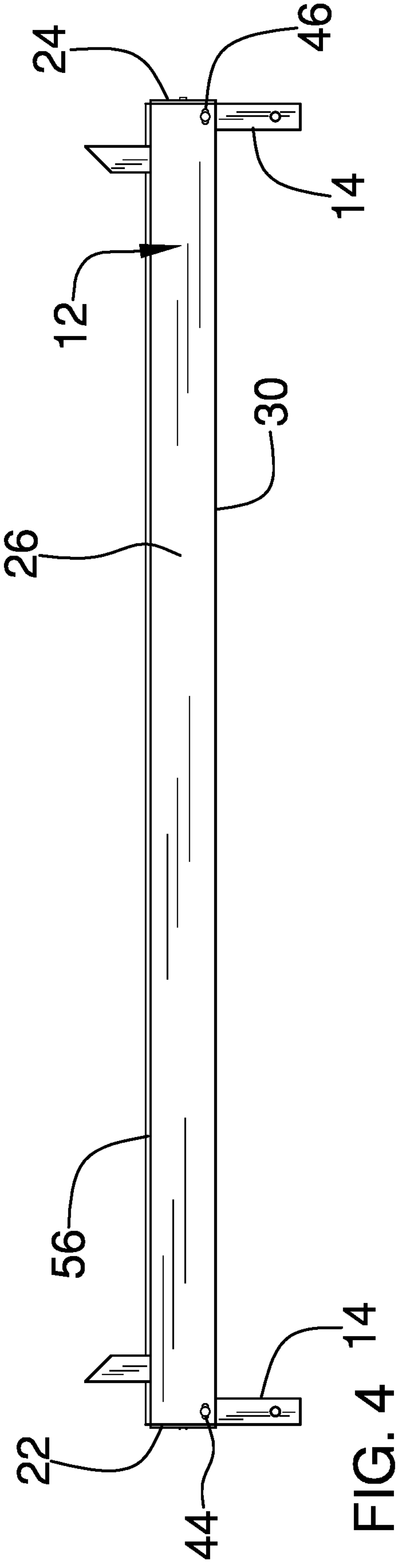
FIG. 4 is a front view of an embodiment of the disclosure.
Figure 5:
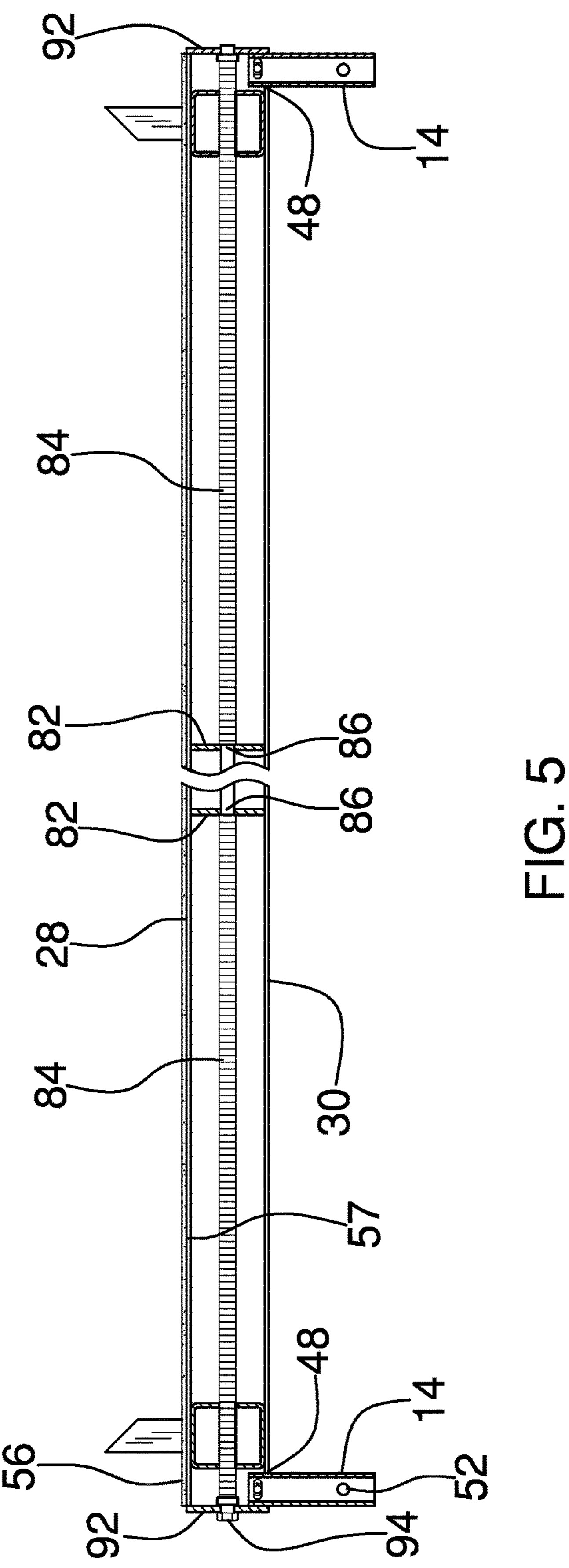
FIG. 5 is a cross sectional view taken along line 5-5 of FIG. 3 of an embodiment of the disclosure.
Figure 6:
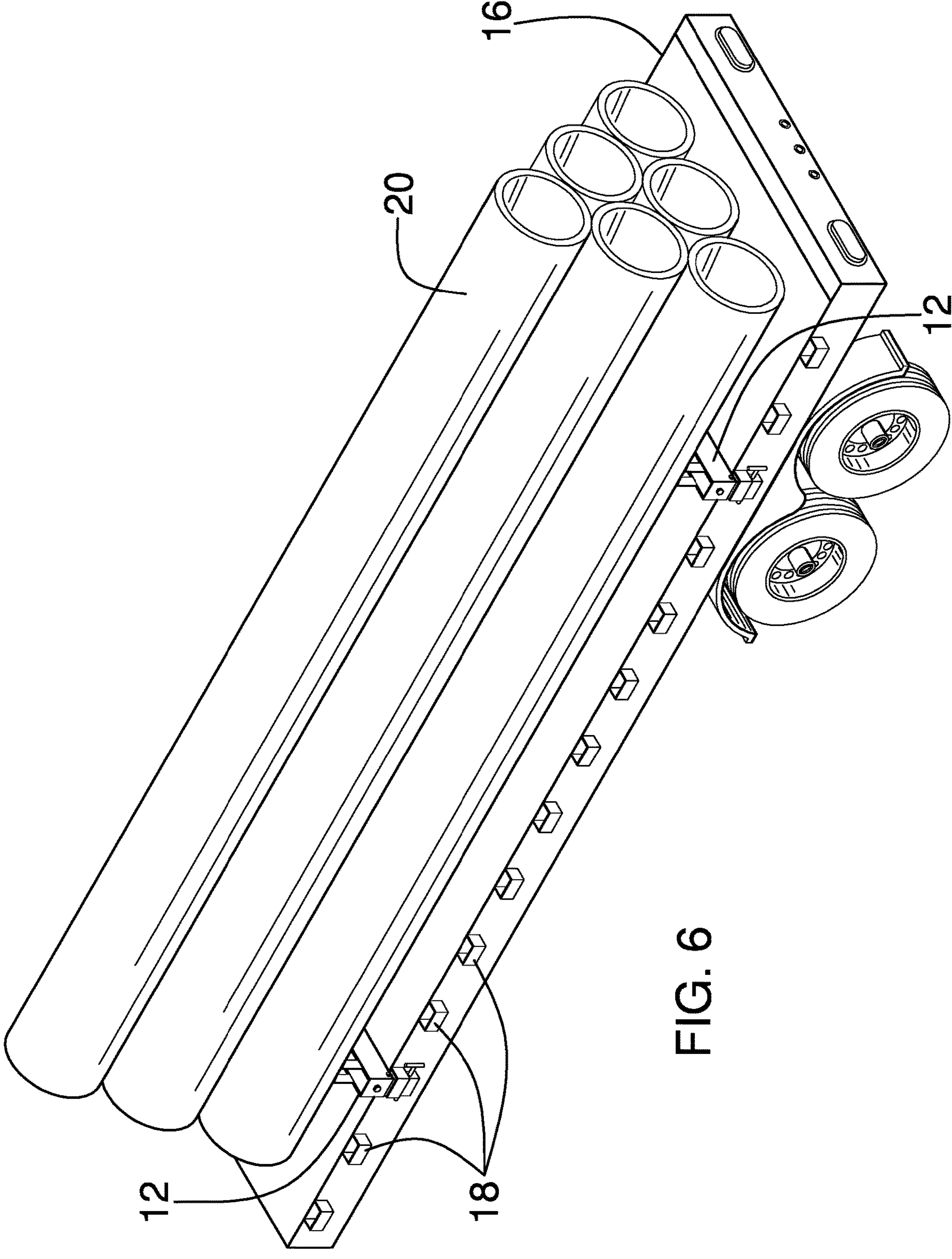
FIG. 6 is a perspective in-use view of an embodiment of the disclosure.
Figure 7:
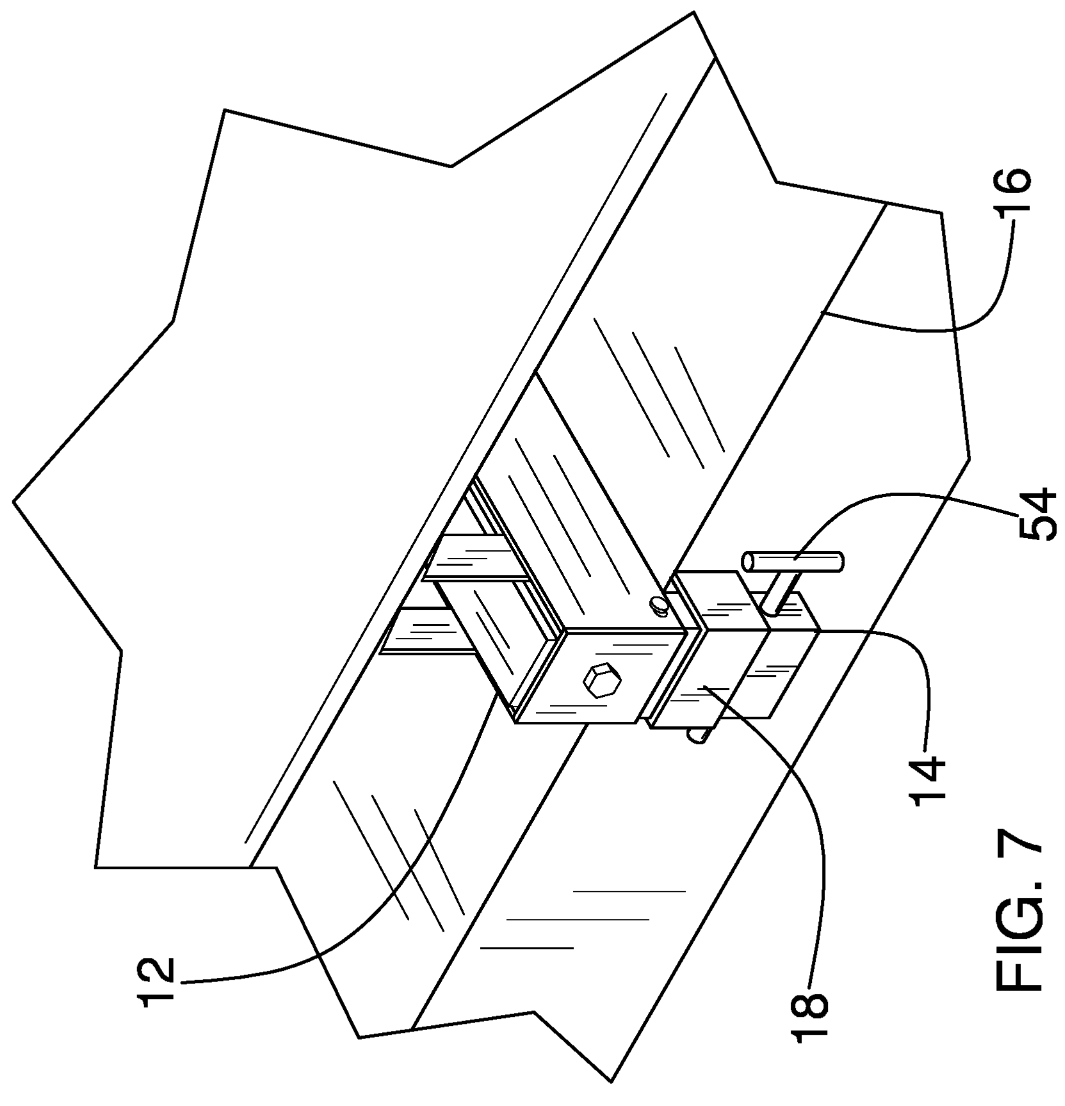
FIG. 7 is a detail in-use view of an embodiment of the disclosure showing a foot extending through an engagement bracket on a cargo trailer.

With reference now to the drawings, and in particular to FIGS. 1 through 7 thereof, a new cargo device embodying the principles and concepts of an embodiment of the disclosure and generally designated by the reference numeral 10 will be described.

As best illustrated in FIGS. 1 through 7, the cargo securing device 10 generally comprises a rail 12 has a pair of feet 14 each is pivotally disposed on opposing ends of the rail 12 with respect to each other. The rail 12 can be extended laterally across a cargo trailer 16 having each of the feet 14 engaging a respective attachment bracket 18 on the cargo trailer 16 thereby facilitating cylindrical cargo 20 to be placed upon the rail 12. The cargo trailer 16 may be a flatbed semi-trailer and the cylindrical cargo 20 may be a pipe, a stanchion or any other type of cylindrical cargo that is commonly transported on cargo trailers.

The rail 12 has a first end 22, a second end 24 and an outer wall 26 extending between the first end 22 and the second end 24 and the outer wall 26 has a top side 28, a bottom side 30, a first lateral side 32 and a second lateral side 34 such that the rail 12 has a rectangular shape. Additionally, the rail 12 is substantially hollow having each of the first end 22 and the second end 24 being open. The outer wall 26 has a pair of first slots 36 each extending through the top side 28 and each of the pair of first slots 36 extends from the first end 22 toward a center of the rail 12 having the pair of first slots 36 being spaced apart from each other. The outer wall 26 has a pair of second slots 38 each extending through the top side 28 and each of the pair of second slots 38 extends from the second end 24 toward the center of the rail 12 having the pair of second slots 38 being spaced apart from each other. Each of the pair of first slots 36 has a terminal end 40 that is spaced from a terminal end 42 of a respective one of the pair of second slots 38.

The outer wall 26 has a pair of third slots 44 each extending through a respective one of the first lateral side 32 and the second lateral side 34 of the outer wall 26 of the rail 12. Additionally, each of the third slots 44 is elongated along an axis extending between the first lateral side 32 and the second lateral side 34 and each of the third slots 44 is positioned proximate the first end 22. The outer wall 26 has a pair of fourth slots 46 each extending through a respective one of the first lateral side 32 and the second lateral side 34 of the outer wall 26 of the rail 12. Each of the fourth slots 46 is elongated along an axis extending between the first lateral side 32 and the second lateral side 34 and each of the fourth slots 46 is positioned proximate the second end 24. The outer wall 26 of the rail 12 has a pair of holes 48 each extending through the bottom side 30 of the outer wall 26 and each of the holes 48 is positioned adjacent to a respective one of the first end 22 and the second end 24.

Each of the feet 14 extends through a respective one of the holes 48 having each of the feet 14 extending downwardly from the rail 12. Each of the feet 14 includes a pin 50 extending through a respective one of the pair of third slots 44 and the pair of fourth slots 46 thereby adjustably retaining each of the feet 14 on the rail 12. Each of the feet 14 is slidable toward or away from the center of the rail 12 to accommodate varying widths of cargo trailers. Additionally, each of the feet 14 includes a pin hole 52 extending laterally through the feet 14 to receive a pin 54 for securing each of the feet 14 in the attachment brackets 18 on the cargo trailer 16.

A cushion 56 is provided which has a bottom surface 57 that is attached to the top side 28 of the outer wall 26 of the rail 12 such that the cylindrical cargo 20 can be positioned on top of the cushion 56. The cushion 56 extends between the first end 22 and the second end 24 of the rail 12 and the cushion 56 is offset from each of the pair of first slots 36 and each of the pair of second slots 38. Furthermore, the cushion 56 may be comprised of a friction enhancing material, including but not being limited to rubber or silicone, thereby inhibiting the cylindrical cargo 20 from sliding on the cushion 56.

A pair of clamps 58 is included and each of the pair of clamps 58 is slidably integrated into the rail 12. Each of the pair of clamps 58 is actuatable in a first condition having each of the pair of clamps 58 travelling toward the center of the rail 12. Conversely, each of the pair of clamps 58 is actuatable in a second condition has each of the pair of clamps 58 travelling away from the center of the rail 12. Each of the pair of clamps 58 has a slanted gripping element 60 and the slanted gripping element 60 associated with each of the clamps 58 abuts the cylindrical cargo 20 thereby restraining lateral motion of the cylindrical cargo 20 on the rail 12.

Each of the pair of clamps 58 comprises a block 62 that is slidably positioned within the rail 12 thereby inhibiting the block 62 for rotating and the block 62 has a top wall 64 extending between a front wall 66 and a back wall 68 of the block 62. The block 62 has a first aperture 70 extending through the front wall 66 and the block 62 has a second aperture 72 extending through the back wall 68 and the first aperture 70 is aligned with the second aperture 72. Each of the clamps 58 includes a pair of tabs 74 which each has a lower end attached to the top wall 64 of the block 62 having each of the tabs 74 extending upwardly from the top wall 64. Each of the pair of tabs 74 associated with each of the pair of clamps 58 extends upwardly through a respective one of the pair of first slots 36 and a respective one of the pair of second slots 38 in the top side 28 of the outer wall 26 of the rail 12.

Each of the pair of tabs 74 has an upper end 76 that is angled downwardly between a back edge 78 and a front edge 80 of the tabs 74 such that the upper end 76 of each of the tabs 74 defines a respective one of the slanted gripping elements 60 of the clamps 58. Additionally, each of the tabs 74 is oriented such that the front edge 80 of the tabs 74 is directed toward the center of the rail 12. In this way the upper end 76 of each of the tabs 74 abuts the cylindrical cargo 20 thereby inhibiting the cylindrical cargo 20 from rolling upwardly along the upper end 76. Thus, the pair of tabs 74 associated with each of the pair of clamps 58 abuts opposite sides of the cylindrical cargo 20 with respect to each other.

The rail 12 has a pair of dividing walls 82 that is each positioned within the rail 12 and each of the dividing walls 82 is aligned with the terminal ends 40,42 of respective ones of the first slots 36 and the second slots 38. Each of the pair of clamps 58 includes a screw 84 that has a coupled end 86 and a free end 88. The coupled end 86 of the screw 84 associated with each of the pair of clamps 58 is rotatably coupled to a respective one of the dividing walls 82 in the rail 12 having the screw 84 associated with each of the pair of clamps 58 extending outwardly through a respective one of the first end 22 and the second end 24 of the rail 12. The screw 84 extends through each of the first aperture 70 in the front wall 66 of the block 62 and the second aperture 72 in the back wall 68 of the block 62. Additionally, the screw 84 threadably engages a bounding edge 90 of the first aperture 70. The block 62 travels toward the center of the rail 12 when the screw 84 is rotated in a first direction and the block 62 travels away from the center of the rail 12 when the screw 84 is rotated in a second direction.

Each of the pair of clamps 58 includes a plate 92 and the screw 84 extends through the plate 92. The plate 92 associated with each of the pair of clamps 58 is bonded against a respective one of the first end 22 and the second end 24 of the rail 12. In this way the plate 92 associated with each of the pair of clamps 58 closes the respective first end 22 and second end 24. Additionally, a head 94 of the screw 84 is exposed such that the head 94 of the screw 84 can be engaged with a hand tool for rotating the screw 84.

In use, the rail 12 is positioned to extend across the cargo trailer 16 and each of the feet 14 is inserted into the respective attachment bracket 18. In this way the cylindrical cargo 20 can be positioned in top of the rail 12 when the cylindrical cargo 20 is loaded onto the cargo trailer 16. The screw 84 associated with each of the clamps 58 is rotated in the first direction until the tabs 74 associated with each of the clamps 58 abuts the cylindrical cargo 20. In this way the pair of clamps 58 inhibit the cylindrical cargo 20 from rolling on the cargo trailer 16 thereby enhancing securing the cylindrical cargo 20 to the cargo trailer 16. As is most clearly shown in FIG. 6, a pair of the rails 12 can be mounted to the cargo trailer 16 on opposite ends of the cargo trailer 16 for securing the cylindrical cargo 20 to the cargo trailer 16.

With respect to the above description then, it is to be realized that the optimum dimensional relationships for the parts of an embodiment enabled by the disclosure, to include variations in size, materials, shape, form, function and manner of operation, device and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cargo securing device for securing cylindrical cargo on a cargo trailer, said device comprising:

a rail having a pair of feet each being disposed on opposing ends of said rail with respect to each other wherein said rail is configured to be extended laterally across a cargo trailer having each of said feet engaging a respective attachment bracket on the trailer thereby facilitating cylindrical cargo to be placed upon said rail;

a pair of clamps, each clamp of said pair of clamps being slidably integrated into said rail, each clamp of said pair of clamps being actuatable in a first condition having each clamp of said pair of clamps travelling toward said center of said rail, each clamp of said pair of clamps being actuatable in a second condition having each clamp of said pair of clamps travelling away from said center of said rail, each clamp of said pair of clamps having a slanted gripping element wherein said slanted gripping element associated with each of said clamps is configured to abut the cylindrical cargo thereby restraining lateral motion of the cylindrical cargo on said rail;

wherein said rail had a first end, a second end and an outer wall extending between said first end and said second end, said outer wall having a top side and a bottom side and a first lateral side and a second lateral side such that said rail has a rectangular shape, said rail being substantially hollow having each of said first end and said second end being open;

wherein said outer wall has a pair of first slots each extending through said top side, each first slot of said pair of first slots extending from said first end toward a center of said rail having said pair of first slots being spaced apart from each other;

wherein said outer wall has a pair of second slots each extending through said top side, each second slot of said pair of second slots extending from said second end toward said center of said rail having said pair of second slots being spaced apart from each other;

wherein each first slot of said pair of first slots has a terminal end being spaced from a terminal end of a respective one of said pair of second slots; and wherein each clamp of said pair of clamps comprises a block being slidably positioned within said rail thereby inhibiting said block for rotating, said block having a top wall extending between a front wall and a back wall of said block, said block having a first aperture extending through said front wall, said block having a second aperture extending through said back wall, said first aperture being aligned with said second aperture, and a pair of tabs, each of said tabs having a lower end being attached to said top wall of said block having each of said tabs extending upwardly from said top wall, each tab of said pair of tabs associated with each clamp of said pair of clamps extending upwardly through a respective one of said pair of first slots and a respective one of said pair of second slots in said top side of said outer wall of said rail.

2. The device according to claim 1, wherein:

said outer wall has a pair of third slots each extending through a respective one of said first lateral side and said second lateral side of said outer wall of said rail, each of said third slots being elongated along an axis extending between said first lateral side and said second lateral side, each of said third slots being positioned adjacent said first end;

said outer wall has a pair of fourth slots each extending through a respective one of said first lateral side and said second lateral side of said outer wall of said rail, each of said fourth slots being elongated along an axis extending between said first lateral side and said second lateral side, each of said fourth slots being positioned adjacent said second end; and said outer wall of said rail having a pair of holes each extending through said bottom side of said outer wall, each of said holes being positioned adjacent to a respective one of said first end and said second end.

3. A cargo securing device for securing cylindrical cargo on a cargo trailer, said device comprising:

a rail having a pair of feet each being disposed on opposing ends of said rail with respect to each other wherein said rail is configured to be extended laterally across a cargo trailer having each of said feet engaging a respective attachment bracket on the trailer thereby facilitating cylindrical cargo to be placed upon said rail;

a pair of clamps, each clamp of said pair of clamps being slidably integrated into said rail, each clamp of said pair of clamps being actuatable in a first condition having each clamp of said pair of clamps travelling toward said center of said rail, each clamp of said pair of clamps being actuatable in a second condition having each clamp of said pair of clamps travelling away from said center of said rail, each clamp of said pair of clamps having a slanted gripping element wherein said slanted gripping element associated with each of said clamps is configured to abut the cylindrical cargo thereby restraining lateral motion of the cylindrical cargo on said rail;

wherein said rail had a first end, a second end and an outer wall extending between said first end and said second end, said outer wall having a top side and a bottom side and a first lateral side and a second lateral side such that said rail has a rectangular shape, said rail being substantially hollow having each of said first end and said second end being open;

wherein said outer wall has a pair of first slots each extending through said top side, each first slot of said pair of first slots extending from said first end toward a center of said rail having said pair of first slots being spaced apart from each other;

wherein said outer wall has a pair of second slots each extending through said top side, each second slot of said pair of second slots extending from said second end toward said center of said rail having said pair of second slots being spaced apart from each other;

wherein each first slot of said pair of first slots has a terminal end being spaced from a terminal end of a respective one of said pair of second slots;

wherein said outer wall has a pair of third slots each extending through a respective one of said first lateral side and said second lateral side of said outer wall of said rail, each of said third slots being elongated along an axis extending between said first lateral side and said second lateral side, each of said third slots being positioned adjacent said first end;

wherein said outer wall has a pair of fourth slots each extending through a respective one of said first lateral side and said second lateral side of said outer wall of said rail, each of said fourth slots being elongated along an axis extending between said first lateral side and said second lateral side, each of said fourth slots being positioned adjacent said second end;

wherein said outer wall of said rail having a pair of holes each extending through said bottom side of said outer wall, each of said holes being positioned adjacent to a respective one of said first end and said second end;

wherein each of said feet extends through a respective one of said holes having each of said feet extending downwardly from said rail;

wherein each of said feet includes a pin extending through a respective one of said pair of third slots and said pair of fourth slots thereby adjustably retaining each of said feet on said rail;

wherein each of said feet being slidable toward or away from said center of said rail wherein said pair of feet is configured to accommodate varying widths of cargo trailers; and wherein each of said feet includes a pin hole extending laterally through said feet wherein said pin hole in each of said feet is configured to receive a pin for securing each of said feet in the attachment brackets on the cargo trailer.

4. The device according to claim 1, further comprising a cushion having a bottom surface being attached to said top side of said outer wall of said rail wherein said cushion is configured to have the cylindrical cargo being positioned on top of said cushion, said cushion extending between said first end and said second end of said rail, said cushion being offset from each first slot of said pair of first slots and each second slot of said pair of second slots.

5. The device according to claim 1, wherein each tab of said pair of tabs has an upper end being angled downwardly between a back edge and a front edge of said tabs such that said upper end of each of said tabs defines a respective one of said slanted gripping elements of said clamps, each of said tabs being oriented such that said front edge of said tabs is directed toward said center of said rail wherein said upper end of each of said tabs is configured to abut the cylindrical cargo thereby inhibiting the cylindrical cargo from rolling upwardly along said upper end.

6. The device according to claim 1, wherein:

said rail has a pair of dividing walls each being positioned within said rail, each of said dividing walls being aligned with said terminal ends of respective ones of said first slots and said second slots; and each of said clamps includes a screw having a coupled end and a free end, said coupled end of said screw associated with each clamp of said pair of clamps being rotatably coupled to a respective one of said dividing walls in said rail having said screw associated with each clamp of said pair of clamps extending outwardly through a respective one of said first end and said second end of said rail;

said screw extends through each of said first aperture in said front wall of said block and said second aperture in said back wall of said block;

said screw threadably engages a bounding edge of said first aperture;

said block travels toward said center of said rail when said screw is rotated in a first direction; and said block travels away from said center of said rail when said screw is rotated in a second direction.

7. The device according to claim 6, wherein each of said clamps includes a plate having said screw extending through said plate, said plate associated with each clamp of said pair of clamps being bonded against a respective one of said first end and said second end of said rail such that a head of said screw is exposed wherein said head of said screw is configured to be engaged with a hand tool for rotating said screw.

8. A cargo securing device for securing cylindrical cargo on a cargo trailer, said device comprising:

a rail having a pair of feet each being disposed on opposing ends of said rail with respect to each other wherein said rail is configured to be extended laterally across a cargo trailer having each of said feet engaging a respective attachment brackets on the trailer thereby facilitating cylindrical cargo to be placed upon said rail, said rail having a first end, a second end and an outer wall extending between said first end and said second end, said outer wall having a top side and a bottom side and a first lateral side and a second lateral side such that said rail has a rectangular shape, said rail being substantially hollow having each of said first end and said second end being open, said outer wall having a pair of first slots each extending through said top side, each first slot of said pair of first slots extending from said first end toward a center of said rail having said pair of first slots being spaced apart from each other, said outer wall having a pair of second slots each extending through said top side, each second slot of said pair of second slots extending from said second end toward said center of said rail having said pair of second slots being spaced apart from each other, each first slot of said pair of first slots having a terminal end being spaced from a terminal end of a respective one of said pair of second slots, said outer wall having a pair of third slots each extending through a respective one of said first lateral side and said second lateral side of said outer wall of said rail, each of said third slots being elongated along an axis extending between said first lateral side and said second lateral side, each of said third slots being positioned adjacent said first end, said outer wall having a pair of fourth slots each extending through a respective one of said first lateral side and said second lateral side of said outer wall of said rail, each of said fourth slots being elongated along an axis extending between said first lateral side and said second lateral side, each of said fourth slots being positioned adjacent said second end, said outer wall of said rail having a pair of holes each extending through said bottom side of said outer wall, each of said holes being positioned adjacent to a respective one of said first end and said second end, each of said feet extending through a respective one of said holes having each of said feet extending downwardly from said rail, each of said feet including a pin extending through a respective one of said pair of third slots and said pair of fourth slots thereby adjustably retaining each of said feet on said rail, each of said feet being slidable toward or away from said center of said rail wherein said pair of feet is configured to accommodate varying widths of cargo trailers, each of said feet including a pin hole extending laterally through said feet wherein said pin hole in each of said feet is configured to receive a pin for securing each of said feet in the attachment brackets on the cargo trailer, said rail having a pair of dividing walls each being positioned within said rail, each of said dividing walls being aligned with said terminal ends of respective ones of said first slots and said second slots;

a cushion having a bottom surface being attached to said top side of said outer wall of said rail wherein said cushion is configured to have the cylindrical cargo being positioned on top of said cushion, said cushion extending between said first end and said second end of said rail, said cushion being offset from each first slot of said pair of first slots and each second slot of said pair of second slots;

a pair of clamps, each clamp of said pair of clamps being slidably integrated into said rail, each clamp of said pair of clamps being actuatable in a first condition having each clamp of said pair of clamps travelling toward said center of said rail, each clamp of said pair of clamps being actuatable in a second condition having each clamp of said pair of clamps travelling away from said center of said rail, each clamp of said pair of clamps having a slanted gripping element wherein said slanted gripping element associated with each of said clamps is configured to abut the cylindrical cargo thereby restraining lateral motion of the cylindrical cargo on said rail, each clamp of said pair of clamps comprising:

a block being slidably positioned within said rail thereby inhibiting said block for rotating, said block having a top wall extending between a front wall and a back wall of said block, said block having a first aperture extending through said front wall, said block having a second aperture extending through said back wall, said first aperture being aligned with said second aperture;

a pair of tabs, each of said tabs having a lower end being attached to said top wall of said block having each of said tabs extending upwardly from said top wall, each tab of said pair of tabs associated with each clamp of said pair of clamps extending upwardly through a respective one of said pair of first slots and a respective one of said pair of second slots in said top side of said outer wall of said rail, each tab of said pair of tabs having an upper end being angled downwardly between a back edge and a front edge of said tabs such that said upper end of each of said tabs defines a respective one of said slanted gripping elements of said clamps, each of said tabs being oriented such that said front edge of said tabs is directed toward said center of said rail wherein said upper end of each of said tabs is configured to abut the cylindrical cargo thereby inhibiting the cylindrical cargo from rolling upwardly along said upper end;

a screw having a coupled end and a free end, said coupled end of said screw associated with each clamp of said pair of clamps being rotatably coupled to a respective one of said dividing walls in said rail having said screw associated with each clamp of said pair of clamps extending outwardly through a respective one of said first end and said second end of said rail, said screw extending through each of said first aperture in said front wall of said block and said second aperture in said back wall of said block, said screw threadably engaging a bounding edge of said first aperture, said block traveling toward said center of said rail when said screw is rotated in a first direction, said block traveling away from said center of said rail when said screw is rotated in a second direction; and a plate having said screw extending through said plate, said plate associated with each clamp of said pair of clamps being bonded against a respective one of said first end and said second end of said rail such that a head of said screw is exposed wherein said head of said screw is configured to be engaged with a hand tool for rotating said screw.

* * * * *